Oct. 2, 1945.   S. HOLM   2,385,919
REEL TYPE BAKE OVEN
Filed April 14, 1944   3 Sheets-Sheet 1

INVENTOR.
Sven Holm
BY
ATTORNEY

Oct. 2, 1945.  S. HOLM  2,385,919
REEL TYPE BAKE OVEN
Filed April 14, 1944  3 Sheets-Sheet 2

INVENTOR.
Sven Holm
BY
James J. Whelen
ATTORNEY

Oct. 2, 1945.   S. HOLM   2,385,919
REEL TYPE BAKE OVEN
Filed April 14, 1944   3 Sheets-Sheet 3
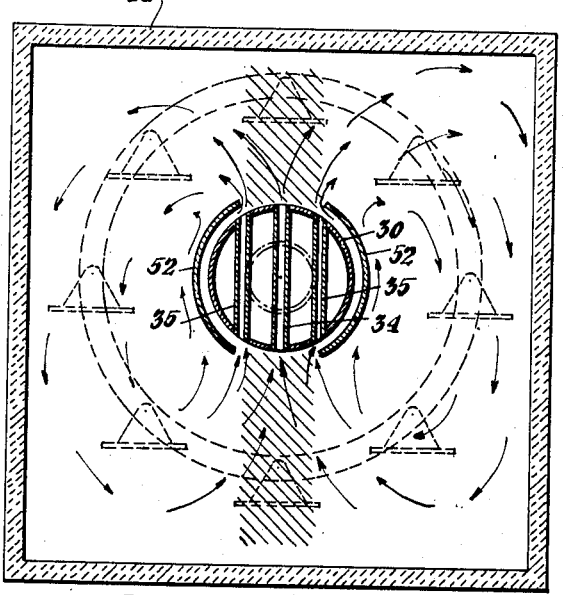
FULL CONVECTED HEAT
TOP AND BOTTOM RADIANT HEAT
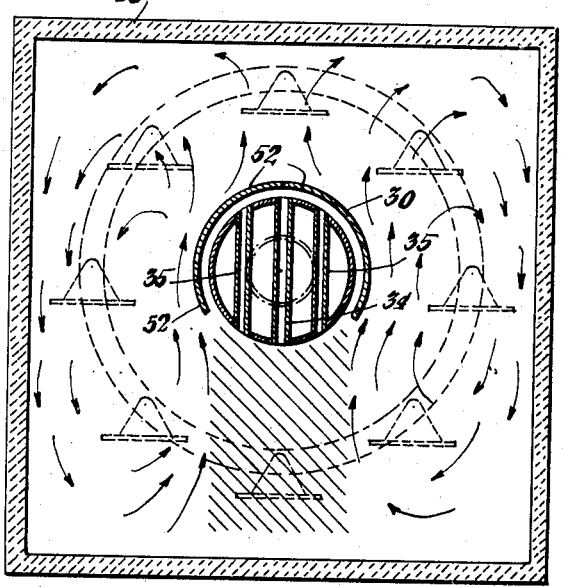
REDUCED CONVECTED HEAT
TOP RADIANT HEAT
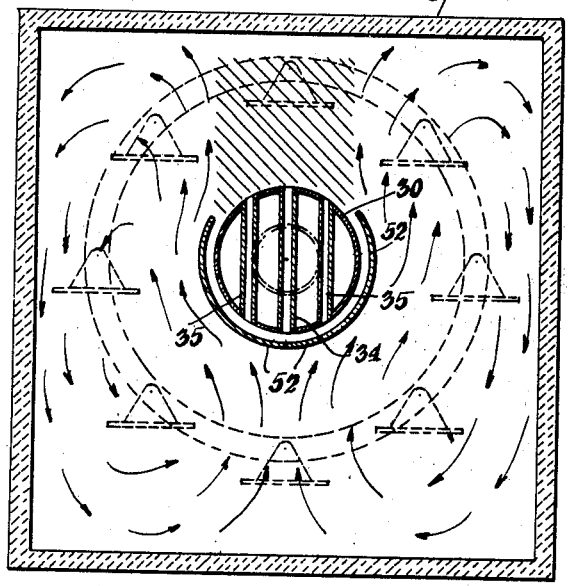
REDUCED CONVECTED HEAT
BOTTOM RADIANT HEAT
INVENTOR.
Sven Holm
BY
ATTORNEY Patented Oct. 2, 1945

2,385,919

UNITED STATES PATENT OFFICE 2,385,919

REEL TYPE BAKE OVEN

Sven Holm, Wellsville, N. Y., assignor to The Air Preheater Corporation, New York, N. Y.

Application April 14, 1944, Serial No. 531,024

4 Claims. (Cl. 107—59)

The present invention relates to bake ovens and particularly to improvements in bake ovens of the reel type.

In bake ovens of the reel type the articles to be baked are subjected to heat while carried on trays supported by a rotary reel in the baking chamber. A feature of the present invention resides in locating a heat exchange unit in the central space enclosed by the reel where it may transmit heat directly to the products to be baked as they move around it as well as to the air in the oven. A second feature resides in the provision of deflecting shields between the heat exchange unit and trays adapted to be adjusted so as to control the transmission of heat from the heat exchange units to the products.

The invention will be best understood upon consideration of the following detailed description of an illustrative embodiment thereof when read in conjunction with the accompanying drawings in which:

Figures 4, 5 and 6 are diagrammatic views illustrating various adjustments of the deflecting shields for controlling the transmittal of heat to the product that is being baked.

Figure 1:
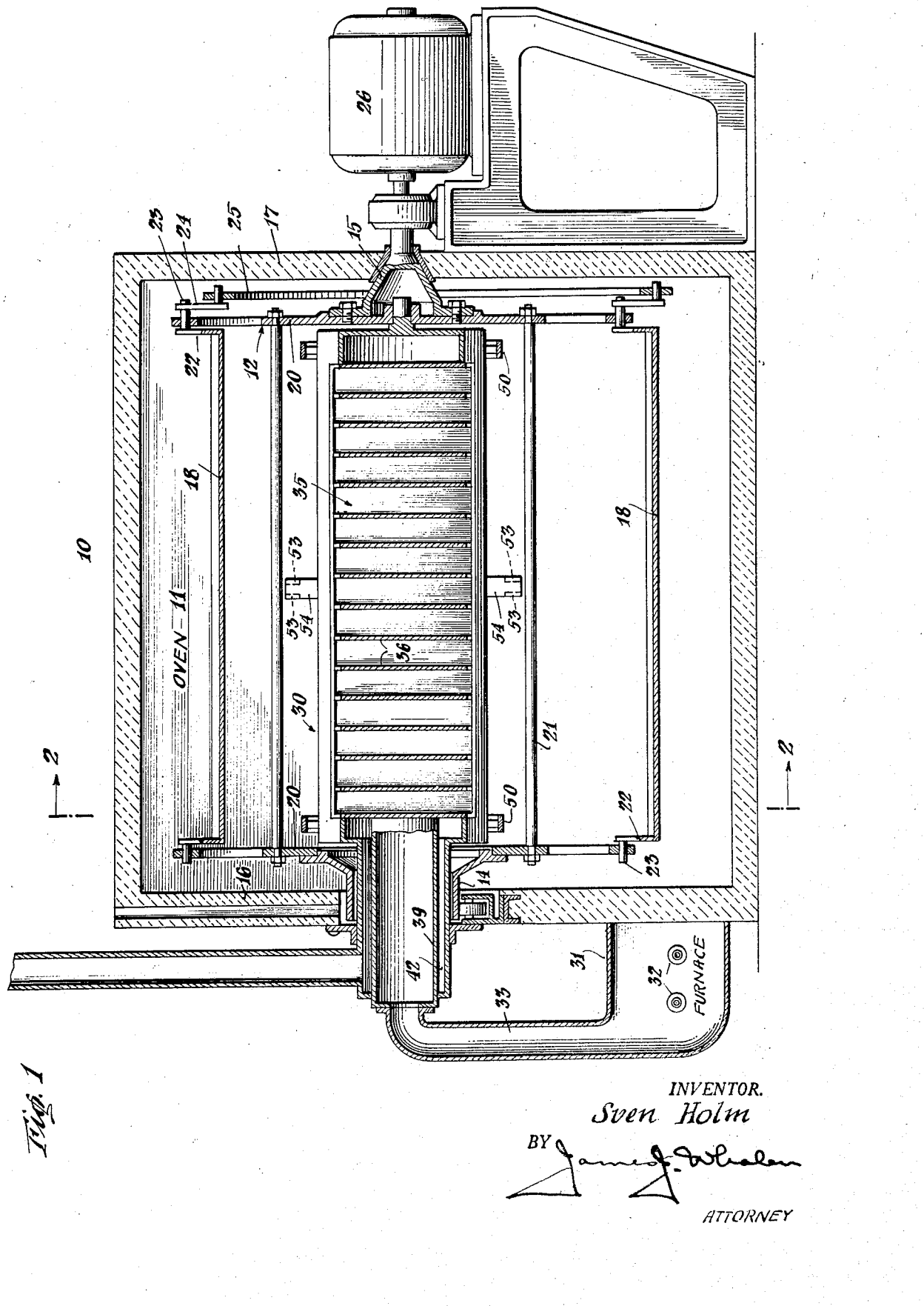
Figure 1 is a longitudinal sectional view as seen on line 1—1 in Fig. 2 through a bake oven embodying the present invention.
Figure 2:
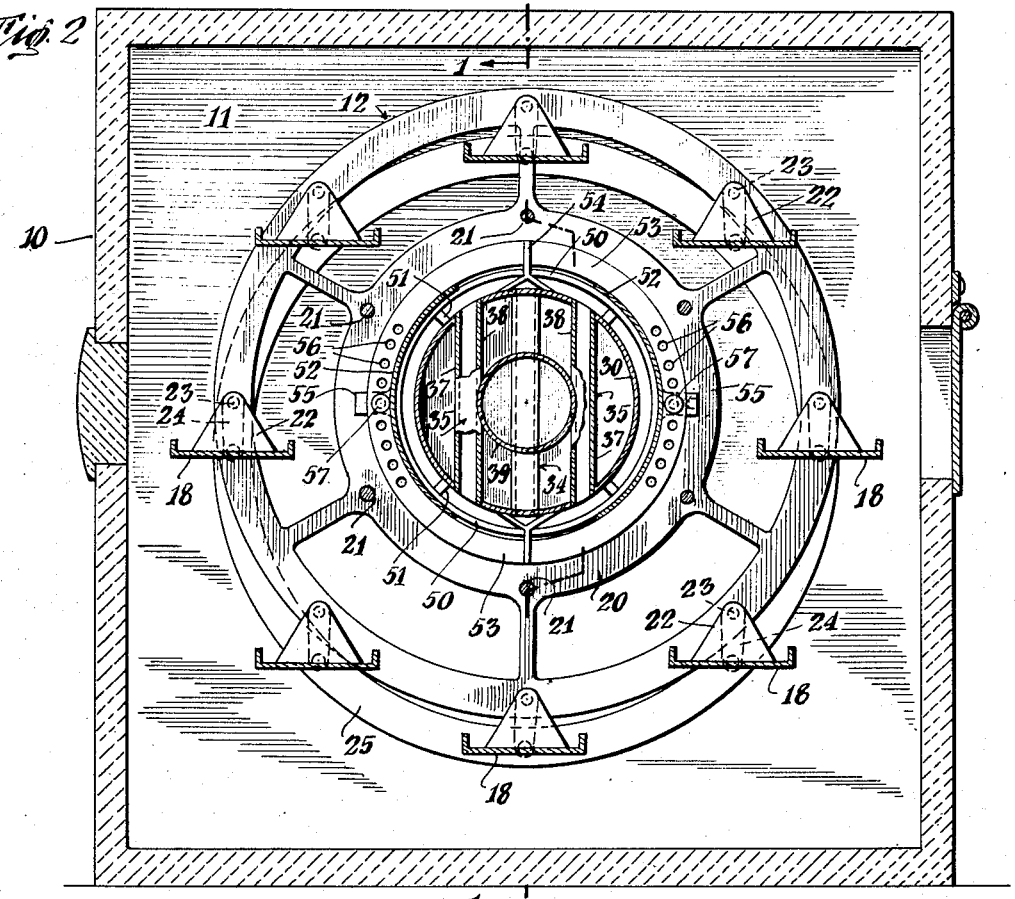
Figure 2 is a transverse sectional view on the line 2—2 in Figure 1.

As appears in Figures 1 and 2, the bake oven comprises a rectangular casing 10 forming a baking chamber 11 that encloses a reel designated as a whole by the numeral 12. The reel 12 is provided with trunnions 14 and 15 journalled in the end walls 16 and 17 of the oven and is equipped with a plurality of trays 18 carrying bread loaves or other products to be baked by exposure to heat released in the oven. The reel consists of spiders 20 attached to the trunnions 14, 15 and interconnected in laterally spaced relation by rods 21. At either end of each tray 18 there is an upstanding bracket 22 provided with a pintle 23 for pivotally mounting the tray on the reel. Connected with the pintle at one end of each tray is a crank arm 24 with which is associated a conventional stabilizing ring 25. The reel 12 is rotated by a motor 26 operatively connected to the trunnion 15 at its right hand end.

It will be noticed that the trunnion 14 at the left hand end not only is considerably larger than would seem to be required to journal its end of a reel such as that illustrated but is also hollow. Being hollow it forms a conduit for the flow of hot gases such as the products of combustion of a furnace 31 to and from a heat exchange unit 30 which in the form shown is of the "field tube" type. The heat exchange unit or heater 30 is disposed substantially centrally within the reel and extends longitudinally thereof opposite the trays 18.

As may be noted in Fig. 2, the longitudinal axis of the heater 30 is located somewhat above the center of the circle of rotation of the bottoms of the trays 18 so that the greater part of the heater is disposed above this axis and the heater unit as a whole is closer to the bottoms of the trays momentarily at the upper part of the chamber than to parts of trays at the lower part of the reel. As shown the furnace is equipped with fuel burners 32 and is located exteriorly of the chamber although it might be located within the chamber along one side and below the reel.

Figure 3:
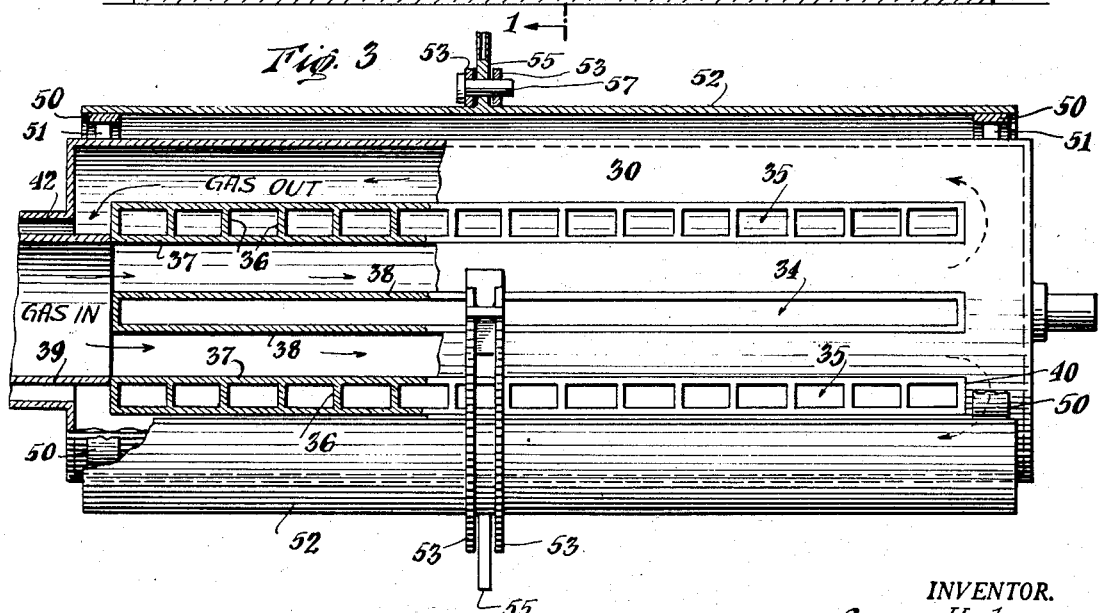
Figure 3 is a plan view partly broken away and partly sectioned of the heat exchange unit shown in Figure 1.

The heat exchange unit 30 is a cylindrical drum formed with a plurality of vertical slot-like ducts extending vertically therethrough from top to bottom and terminating just short of either end of the unit 30, one duct 34 being substantially along the longitudinal axis of the unit while other ducts 35 are disposed symmetrically at either side thereof. The ducts 34, 35 may be subdivided transversely by fin-like partitions 36 which serve to increase the amount of heat-transmitting surface. The inner side walls 37 (Fig. 3) of the ducts 35 at the side of the axis of the unit together with the facing walls 38 of duct 34 define a central passage in communication at the left ends with a sleeve 39 concentrically positioned in the trunnion 14 and forming a gas inlet conduit in communication at its outer end with a pipe 33 connected to the oven 31 so that its gases flow into the central part of the unit 30 and to the far end thereof.

Passing around the ends 40 of the ducts 35 the gases flow back to an annular space 42 surrounding the sleeve 38 and are discharged into a stack 44.

Adjacent each end of the heater 30 a ring 50 is supported in spaced relation above the heater unit by studs 51 extending radially from its surface. These rings 50 provide supporting guides on which the end parts of convex deflecting shields 52 rest. Midway of the length of the heater unit 30 there are a pair of rings 53 supported from its surface by the radially projecting members 54 (Fig. 1). The rings 53 are located outside and preferably in guiding contact with the deflecting shields 52 and are spaced axially of the unit 30 to form a slot for a lug 55 projecting outwardly from each shield. Suitable holes 56 are provided in the rings and in the lugs 55 to receive a locking pin 57 that maintains either shield in a determined adjusted position between the heater unit 30 and the trays 18.

The heat deflecting shields 52 are shown as arcuately convex in form and each subtending an angle of less than 180 degrees. When adjusted to lie symmetrically at either side of the heater 30 as shown in Fig. 4 there is an open space between the shields both at the top and bottom of the unit for the free passage for full convected heat through the ducts 34, 35 of the unit as indicated by the arrows and also for the full transmission of radiated "top and bottom heat," i. e. to the tops and bottoms of products carried on the trays of the reel as they pass through the low and high portions in their circuit. This is represented by the cross-hatching in Figs. 4 to 6. When the shields are adjusted so that there is an opening between them only at the bottom as appears in Fig. 5, the amount of convected heat is reduced while fully radiated heat is provided to the top of the product. In Fig. 6 the reverse arrangement is shown wherein the separation of the shields at their top portions permits full radiated heat to the bottom of the product and also a reduced amount of convected heat.

It should be noted that because of the location of the heat exchange unit within the reel the overall size of a baking oven of this type may be reduced as compared with those in which the heating elements in the form of tubes or conduits are located on the walls of the unit outside the path of rotation of the trays. The location of the heater element 30 in the center of the oven requires all the heat to travel through the path of trays carrying the baked goods before escaping through the walls or vents, resulting in more even baking and causing the inner wall surfaces to be cooler so that the amount of insulation needed is minimized and the heat losses are likewise reduced.

An oven constructed in accordance with the present invention also provides better control of baking heat and enables higher temperature gases to be used in the heating unit without scorching the products inasmuch as the shields may be adjusted to control the transmission of heat to the products on trays in various positions about the axis of rotation of the reel. Because of the location of the heater unit 30 as a whole somewhat above the center of the circular path of movement of the bottom of the trays, the latter are closer to the heating surface when passing the high point of their circuit resulting in considerable increase in the intensity of radiation and providing a good bottom heating effect for about one-sixth of a revolution of the reel.

What I claim is:

1. In a bake oven having a casing forming a baking chamber enclosing a reel provided with shelves for articles to be cooked spaced circumferentially about the axis of rotation of said reel, a heat exchange unit extending axially of said reel and disposed substantially centrally within said reel opposite said shelves for radiating heat to articles to be cooked thereon, a hollow trunnion for rotatively supporting one end of said reel journalled in an end wall of said casing, and a conduit extending through said trunnion and connected to said heat exchange unit for supplying a heating medium to the latter; heat deflecting shields interposed between parts of said heat exchange unit and said shelves; and means for adjustably supporting said shields for movement about the longitudinal axis of said heat exchange unit.

2. In a bake oven having a casing forming a baking chamber enclosing a reel provided with trunnions journalled in the end walls of the latter and with shelves for articles to be cooked spaced circumferentially about the axis of rotation of said reel, a heat exchange unit extending axially of said reel and disposed substantially centrally within said reel opposite said shelves for radiating heat to articles to be cooked thereon, and means for supplying a heating medium to said unit; means forming substantially vertical ducts through said heat exchange unit for the flow of the air within said chamber from its lower part to its upper part: a plurality of heat deflecting shields together subtending an angle of approximately 180° about the axis of said reel positioned at opposite sides of said heat exchange unit between it and the shelves of said reel; and means supporting and guiding said shields for adjustment in an arcuate path about the longitudinal axis of said heat exchange unit.

3. In a bake oven having a casing forming a baking chamber enclosing a reel provided with trunnions journalled in the end walls of the latter and with shelves for articles to be cooked spaced circumferentially about the axis of rotation of said reel, a heat exchange unit extending axially of said reel and disposed substantially centrally within it opposite said shelves for radiating heat to articles to be cooked thereon, and means for supplying a heating medium to said unit; means forming substantially vertical ducts through said heat exchange unit for the flow of the air within said chamber from its lower part to its upper part: a pair of arcuate convex heat deflecting shields each subtending angles of less than 180° about the axis of said reel positioned at opposite sides of said heat exchange unit between it and the shelves of said reel; and means supporting and guiding said shields for adjustment in an arcuate path about the longitudinal axis of said heat exchange unit to an extent at least sufficient to cover either end of the passages through said unit.

4. In a bake oven having a casing forming a baking chamber enclosing a reel provided with shelves for articles to be cooked spaced circumferentially about the axis of rotation of said reel, a heat exchange unit extending axially of said reel and disposed substantially centrally within said reel opposite said shelves for radiating heat to articles to be cooked thereon, and means for supplying a heating medium to said unit; means forming substantially vertical ducts through said heat exchange unit for the flow of the air within said chamber from its lower part to its upper part: heat deflecting shields positioned at opposite sides of said heat exchange unit between it and the shelves of said reel; and means supporting and guiding said shields or said unit for adjustment in a common arcuate path about its longitudinal axis.

SVEN HOLM.